(12) United States Patent
Baker et al.

(10) Patent No.: US 8,467,613 B2
(45) Date of Patent: Jun. 18, 2013

(54) AUTOMATIC RETRIEVAL OF OBJECT INTERACTION RELATIONSHIPS

(75) Inventors: Nathan A. Baker, Durham, NC (US);
James D. Creasman, Apex, NC (US);
Barry J. Pellas, Durham, NC (US);
Adrian P. Vrouwenvelder, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 918 days.

(21) Appl. No.: 12/568,426

(22) Filed: Sep. 28, 2009

(65) Prior Publication Data
US 2011/0075884 A1    Mar. 31, 2011

(51) Int. Cl.
*G06K 9/56* (2006.01)
(52) U.S. Cl.
USPC ........................................ 382/205

(58) Field of Classification Search
USPC .................. 345/651, 662, 677; 382/205, 256, 382/291; 701/124
See application file for complete search history.

(56) References Cited

U.S. PATENT DOCUMENTS

| | | | |
|---|---|---|---|
| 4,545,067 A | 10/1985 | Juvin et al. | |
| 5,103,488 A * | 4/1992 | Gemello et al. | 382/199 |
| 5,838,973 A | 11/1998 | Carpenter-Smith et al. | |
| 6,763,148 B1 * | 7/2004 | Sternberg et al. | 382/293 |

* cited by examiner

*Primary Examiner* — Gregory F Cunningham
(74) *Attorney, Agent, or Firm* — Steven L. Nichols; Van Cott, Bagley, Cornwall & McCarthy P.C.

(57) ABSTRACT

A method for automatically retrieving interaction information between objects, including: with a server, transforming a first image and a second image submitted to said server from a source into first and second sets of parameters, respectively; searching a database for an interaction relationship between the first and second images using the first and second sets of parameters; and returning a representation of the interaction relationship to the source.

20 Claims, 7 Drawing Sheets

AUTOMATIC RETRIEVAL OF OBJECT INTERACTION RELATIONSHIPS

BACKGROUND

The present specification relates to the field of object interactions. Specifically, the present specification relates to the field of procuring interaction diagrams between various objects.

The interactions between two or more different objects can be many. The interactions may range from simple to complicated and can include the interaction of people with the objects, as well. Understanding the interactions between various objects can help to understand more about each individual object, as well as help to learn more about how the objects can be used with one another. The interaction relationships between two or more objects may also be useful in allowing a person to perform a do-it-yourself project.

BRIEF SUMMARY

A method for automatically retrieving interaction information between objects, includes: with a server, transforming a first image and a second image submitted to said server from a source into first and second sets of parameters, respectively; searching a database for an interaction relationship between the first and second images using the first and second sets of parameters; and returning a representation of the interaction relationship to the source.

An object interaction relationship procurement system includes a server configured to receive images from an image source, the server comprising an image-translation program for converting images into corresponding sets of parameters; and a database in communication with the server comprising a searchable store of object interaction relationships. The server is configured to search the database for an object interaction relationships corresponding to the parameters and return a representation of the object interaction relationship to the source.

A computer program product for automatically retrieving interaction information between objects includes a computer readable storage medium having computer readable program code embodied therewith. The computer readable program code includes: computer readable program code configured to transform a first image into a first set of parameters and a second image into a second set of parameters; computer readable program code configured to search a database for an interaction relationship between objects in the first and second images; and computer readable program code configured to return a representation of the interaction relationship to a source of the first image and the second image in an organized format.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
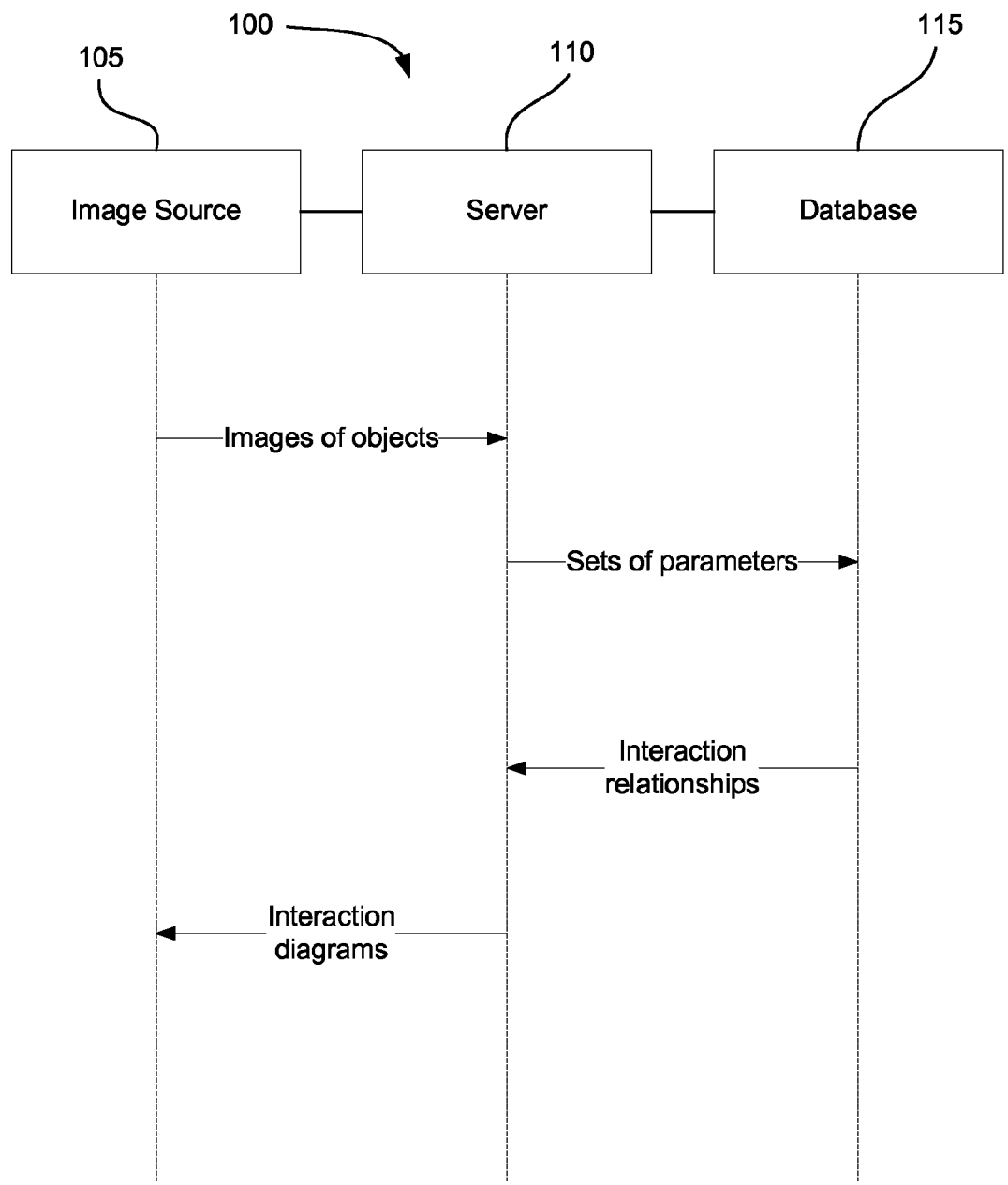
FIG. 1 is a diagram of an illustrative system for automatically retrieving interaction information between objects, according to one exemplary embodiment of principles described herein.

The present specification discloses a system and method for automatically retrieving interaction information between two or more objects. More specifically, the present specification discloses using images of the two or more objects to retrieve the interaction relationships between the objects. According to the principles described herein, a user may submit images of two or more objects to a server where the images will be converted into a set of parameters. The sets of parameters extrapolated from the images may then be used to search a database or set of databases for interaction relationships between the different sets of parameters.

As used in the present specification and appended claims, the term "image source" refers to a digital device that is capable of acquiring a visual, digital representation of an object. The image source may include, but is not limited to, a desktop computer, a laptop computer, a cellular phone, personal digital assistant, other mobile communication device, a digital camera with computer or network connectivity, a scanner, and any device with digital image acquisition capabilities.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, an illustrative system (100) for automatically retrieving interaction information between objects is shown. The system (100) includes an image source (105), a server (110), and a database (115). The image source (105) is communicatively connected to the server (110). The connection may be an electrical connection, a wireless connection, or any other connection that allows the image source (105) to communicate digital information to the server (110). The image source (105) may provide a plurality of digital images, or pictures, to the server (110). The images include two or more objects to be compared.

After receiving the images, the server (110) converts the images into a set of parameters related to the objects in the images. The server (110) may utilize an image translation algorithm that is able to analyze the images and determine the identity of any objects in each of the images. The algorithm may be able to recognize objects in the images based on shape, color, relative size, text in the image, and/or other image recognitions techniques. The server (110) may then use the data generated from the image recognition algorithm to create sets of parameters that relate to the objects in the images. A data source having tagged data may be queried with the data from the images to obtain the parameters. In some embodiments, the images may include meta data tags used to obtain the parameters.

After obtaining the sets of parameters related to the objects in the images, the server (110) searches a database (115) based on the sets of parameters. The database (115) may be a general search database that is not application specific and is accessed by the server (110) over a remote connection, or the database (115) may be a database specifically designed for the system (100) of the present specification. Each set of parameters may include one or more descriptors for each of the objects in the images. According to some embodiments, each image may contain one object, and the set of parameters generated from each image is related to the object in the particular image. According to other embodiments, an image may contain more than one object, and the set of parameters generated from that image may be related to all of the objects in the image based on a common trait between the objects. The set of parameters may include the name and traits of the object, as well as other descriptors, such as places where the object is commonly found or other objects that the object in the image is commonly associated with, including categories.

The database (115) may be searched for terms related to the sets of parameters for determining interaction relationships between the objects in the images. The database (115) may alternatively or additionally be searched for graphical representations of the object interaction relationships. In such embodiments, the database (115) may be specifically configured to include a large store of common pairs or sets of object interaction relationships. The interaction relationships may be stored in textual descriptions or in graphical representations to be returned to the server (110) as matches in the search.

The database (115) returns the data on the object interaction relationships from the database search to the server (110). According to one embodiment, the server (110) may then organize the interaction relationships for presenting to the user at the image source (105) according to commonality, complexity, or other method of organization. The method of organization may be set according to the preference of the user and may be stored either at the image source (105) or at the server (110), depending on the application. The user may scroll through a list of interaction relationships provided by the server (110).

The server (110) may receive the interaction relationships from the database (115) and then dynamically generate an illustrative interaction diagram of the relationships for presentation to the user at the image source (105). If the database (115) returns images or diagrams that were already stored in the database (115), the server (110) may simply forward the diagrams directly to the image source (105). The diagrams show the interaction relationship between each of the objects in the images. The diagrams may be configured in any way that would suitably demonstrate the interactions between the objects. The user may browse the diagrams or other data returned to the image source (105) for an interaction relationship as desired. The user may view all of the interaction diagrams found in the search and may choose to print or save the relationships for later viewing.

Figure 2:
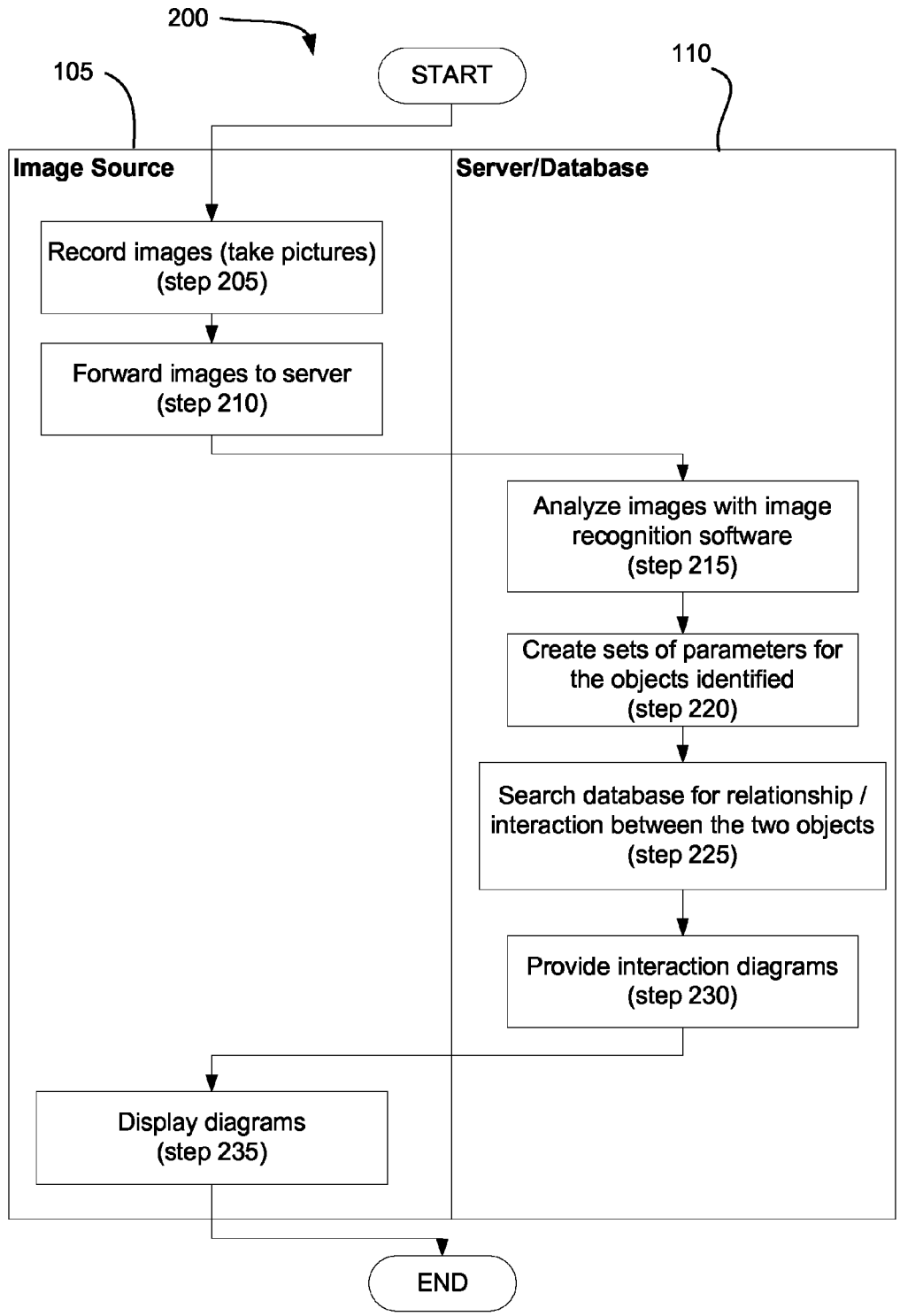
FIG. 2 is a flowchart showing an illustrative method for automatically retrieving interaction information between objects, according to one exemplary embodiment of principles described herein.

FIG. 2 shows a flowchart (200) illustration of a method for automatically retrieving object interaction relationships. According to the method, a user may record (205) images at an image source (105). This may include taking pictures of one or more of the physical objects. After recording the pictures, the images may then be forwarded (210) to a server (110) communicatively connected to the image source (105).

The server (110) analyzes (215) the images using image recognition software in order to determine the objects in the images. The server (110) is also able to obtain data for the objects identified in the images after analyzing the images. The server (110) uses this data to create (220) sets of parameters, each set relating to an object in the images.

The sets of parameters including the object data are then used to search (225) a database (115) for interaction relationships between the objects. The interaction relationships may include instructions for using the objects together, or the relationships may include a description of how the objects are physically or otherwise connected with each other. The interaction relationships may include other objects, if needed, and may include the role a person may have in the interaction between the objects. The server (110) takes the interaction relationships returned by the database search and, if not already done at the database, creates diagrams illustrating the interaction relationships in order to provide (230) a visual illustration of the relationships, which can help understand the relationships. The diagrams are sent to the image source (105) and then displayed (235) for the user.

Figure 3:
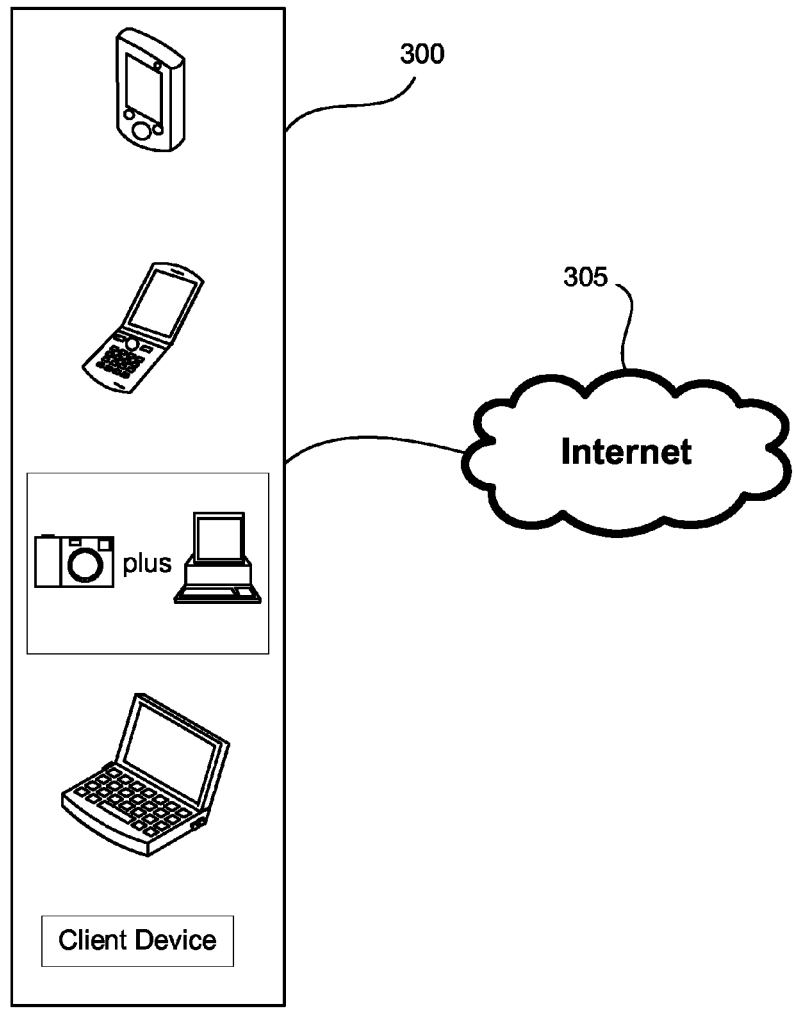
FIG. 3 is a diagram illustrating different image sources, according to various exemplary embodiments of principles described herein.

FIG. 3 illustrates a plurality of different image acquiring devices (300) that may be used as or with an image source (105) according to the principles of the present specification. The image source (105) may be any device that is capable of acquiring digital images of the objects to be analyzed, whether the image source (105) itself takes the pictures and converts them to digital images or whether the image sources receives the images from another device and is merely used to connect to the server. According to several embodiments, the image source may be a personal digital assistant (commonly referred to as a "PDA"), a cellular phone, a desktop computer, a laptop, or any such device capable of acquiring and displaying images of the objects and connecting to the server through a communication connection (305). In some embodiments, the communication connection may be an Internet connection, such that the server (110) is a central server to be used by anyone with access to the Internet. In other embodiments, the communication connection (305) may be a direct electrical connection, such that the server (110) is a private server to be used by a small group of users, such as a server in a business setting or the like. The connection (305) may also include a wireless connection. In embodiments using mobile communication devices such as PDAs or cell phones, the connection (305) may be a wireless connection through a cell phone tower using a cellular phone network.

According to one embodiment, the image source (105) may be a computer. The computer may be connected to the server (110) via an Internet connection. An image acquiring device (300) may be connected to the computer, so that the image acquiring device (300) takes the pictures that are converted to digital images and then stored on the computer. The image acquiring device (300) may be a digital camera that captures digital images and is able to upload the images to the computer. The image acquiring device (300) may alternatively be a scanner, which may convert a photograph into a digital image for use on the computer.

In other embodiments, the image source (105) and the image acquiring device (300) may be the same device, or the image acquiring device (300) may be built into the image source (105). For example, as in the embodiment of FIG. 4, the image source (105) may be a cell phone having a built-in digital camera. The digital camera may be used to take pictures of several objects, after which the images are automatically stored in the cell phone memory or on a storage card. Because the cell phone is already connected to the server through the cell phone network, there is no need to transfer the digital images to another device.

According to some embodiments, either the image source (105) or the image acquiring device (300) may allow the user to edit the images. For example, the user may have an image that includes several different objects, but the user wants the server (110) to analyze only one of the objects in the image. The user may crop the image to include only the desired object so that the server (110) doesn't analyze all of the objects in the image. The user may also use other image editing tools that allow the user to sharpen the image or remove speckles from the image so that the server (110) is more easily able to identify the object in the image.

Referring back to FIG. 3, according to another embodiment, the image source (105) is a computer that acquires images containing the desired objects from a remote source, such as a website. The images may be previously existing images that are stored on a server not owned by the user. For example, the user may acquire at least one of the images through an image search on the Internet. This may allow the user to search through many images related to a specific object to find the most desirable representation of the object. The images may be computer-generated, rather than pictures of actual objects. The user may download the images to the computer and then upload the images to the server. Alternatively, the image recognition program on the server may be capable of retrieving images from the Internet if the user provides a link to each image. In such an instance, the server found using the Internet search may become the image source.

Figure 4:
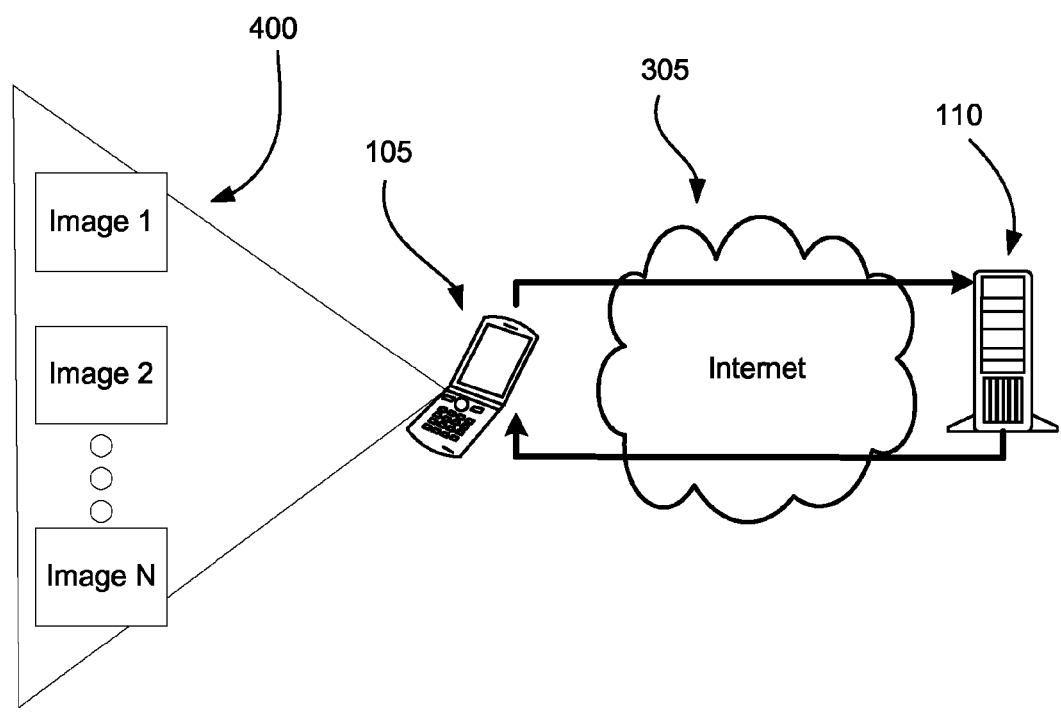
FIG. 4 is a diagram of an illustrative system for retrieving interaction relationships between objects in images acquired using a mobile communication device, according to one exemplary embodiment of principles described herein.

The embodiment of FIG. 4 also shows that the image source (105) may acquire as many images as desired, each containing an object. The image source (105) may acquire "N" images (400) for "N" different objects, where each image is related to a separate object. The image source sends a request to the server over the communication connection (305), and the server (110) analyzes each image to determine the objects in each image. The analysis also provides a set of parameters for each image describing the object in each image (400) and searches the database using "N" sets of parameters. The search returns interaction relationships between the objects. The database may return interaction relationships between all of the objects together. The database may return interaction relationships between one of the "N" objects and each of the other objects, or the database may return interaction relationships between each of the individual objects with each of the other objects separately or in several groups. This may result in a number of interaction relationships much larger than the "N" number of objects.

Figure 5:
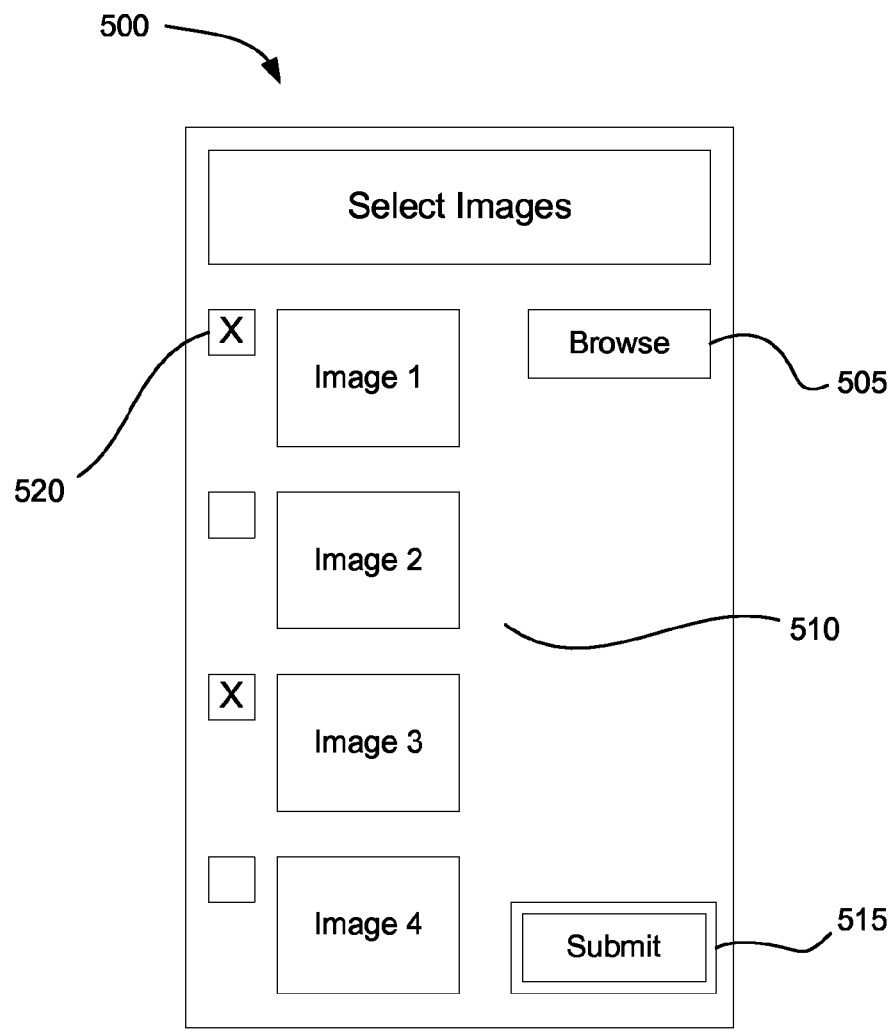
FIG. 5 is a diagram illustrating a user interface for submitting images, according to one exemplary embodiment of principles described herein.

FIG. 5 illustrates a possible user interface (500) for submitting images from the image source to the server. The user interface (500) may be a stand-alone program that may be separately downloaded to the image source. Alternatively, the user interface (500) may be a program that is included with the operating system, such as on a cell phone. The user interface may allow the user to browse the file system on the image source for any images by selecting a browse button (505). The user interface (500) may also display a number of images (510) stored locally as a default setting. The user may change which images (510) are shown in the default setting. This may be useful if certain images are used frequently and the user desires to find interaction relationships between the frequently used images and other images. Additionally, the user interface (500) may allow the user to compare the images (510) with each other by viewing the images side-by-side and select the desired images using check boxes or some other method of marking the desired images. Selecting an image while browsing may cause an image to appear on the user interface. After selecting the desired images to transmit to the server, with the use of a check box (520) in the present embodiment, the user may press a submit button (515) to transmit the images.

As previously mentioned, an image may include more than one object. In such an example, the user may select a single image for submission to the server. When the user submits the image, the server receives the image and analyzes the image. By using the image recognition software, the server may be able to recognize the multiple objects in the single image. The server may also generate a set of parameters for each of the objects in the single image. These generated sets of parameters may then be used to search the database for interaction relationships between the objects found in the single image.

Figure 6:
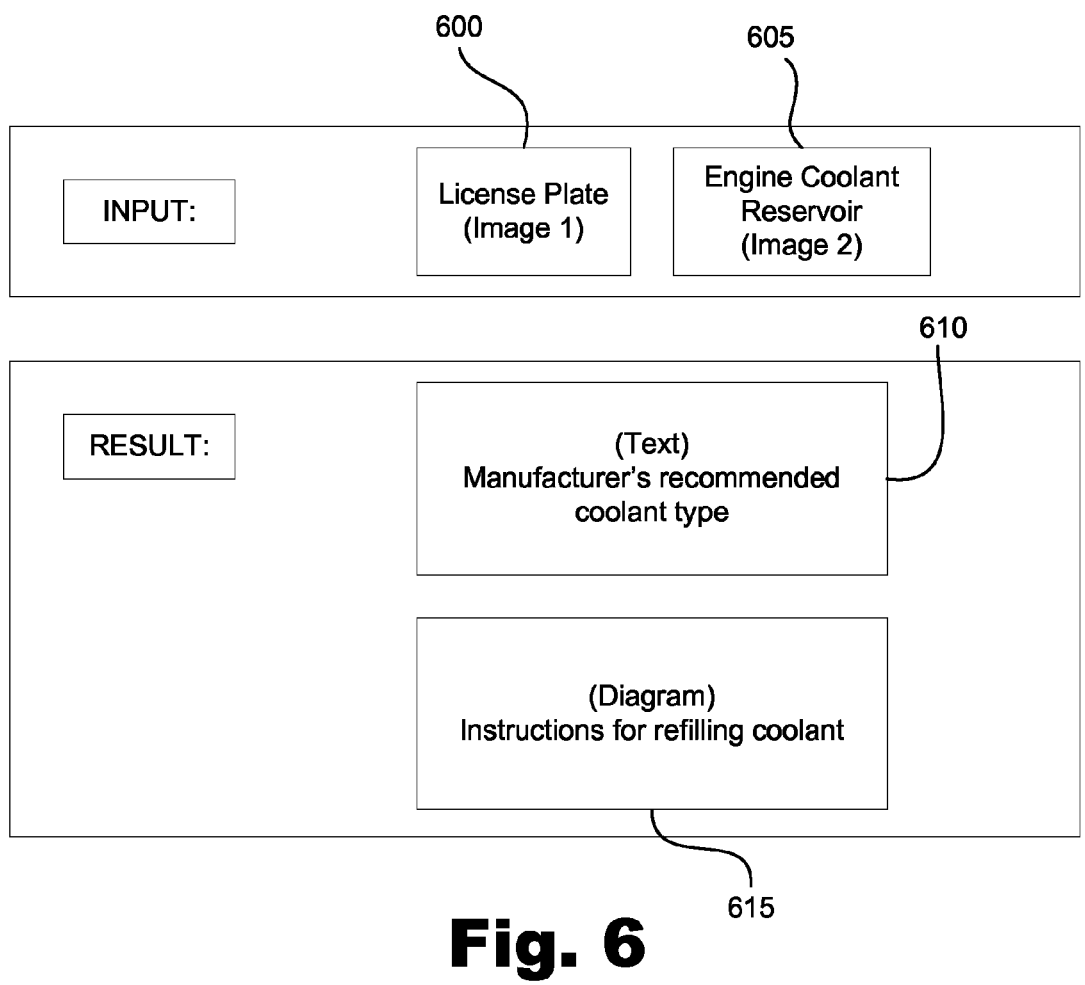
FIG. 6 is a diagram of an illustrative use of a system for retrieving interaction relationships between two objects, according to one exemplary embodiment of principles described herein.

FIG. 6 illustrates an embodiment of an application in which the system of the present specification may be used. According to the present embodiment, the automatic interaction relationship retrieval system may be used in connection with automobiles and automobile parts. For example, a user may want information regarding a specific part of a particular automobile. In one embodiment, the user may input a picture of a license plate (600) connected to the particular automobile as one of the images. Another image may be of a specific part of the automobile, such as the engine coolant reservoir (605).

The server receives these images and analyzes them using the image analysis algorithm. The server recognizes the engine coolant reservoir (605) from the second image. The server may be able to determine the make and model of the automobile attached to the license plate (600) based on the license plate number extrapolated from the image and through a database of license plates and automobiles for each license plate. Alternatively, the user may submit a picture of the actual automobile for the server. After determining the make and model of the automobile, the server generates a set of parameters for each of the automobile and the coolant reservoir. The set of parameters for the automobile may include the make, model, year, and other useful descriptors of the automobile. The set of parameters for the reservoir may include a simple descriptor or more, depending on the application.

After generating the sets of parameters related to the automobile and the coolant reservoir, the sets of parameters are used to search the database for interaction relationships between the automobile and the coolant reservoir. One such relationship which may be returned by the search may include the type (610) of coolant that is recommended for the automobile, which may be shown either with an image of a sample coolant or with text describing the coolant. The relationship may also include a description or step-by-step instructions (615) of how to refill the coolant in the automobile. Other aspects of the interaction relationship may include problems that may occur or precautions which may be taken in order to prevent problems with respect to the reservoir.

After retrieving the interaction relationship from the database, the server may then generate a diagram illustrating the relationships. The diagram may be a graphic or several graphics that display the relationship in a manner that is easily read and interpreted by the user. The diagram may include the images selected by the user, and may also include other images retrieved from the database. The diagram is then sent to the image source for presentation to the user. The diagram allows the user to easily understand the interaction relationship between the objects.

The system may also be used to find instructions on how to recognize or replace worn or broken parts in an automobile. For example, the user may submit images of the automobile and a fuel pump for the automobile. The database may be searched for a description of how to recognize a broken fuel pump and step-by-step instruction of how to replace the fuel pump. This may also extend to instructions for any system or apparatus in order to allow many different kinds of do-it-yourself projects.

Figure 7:
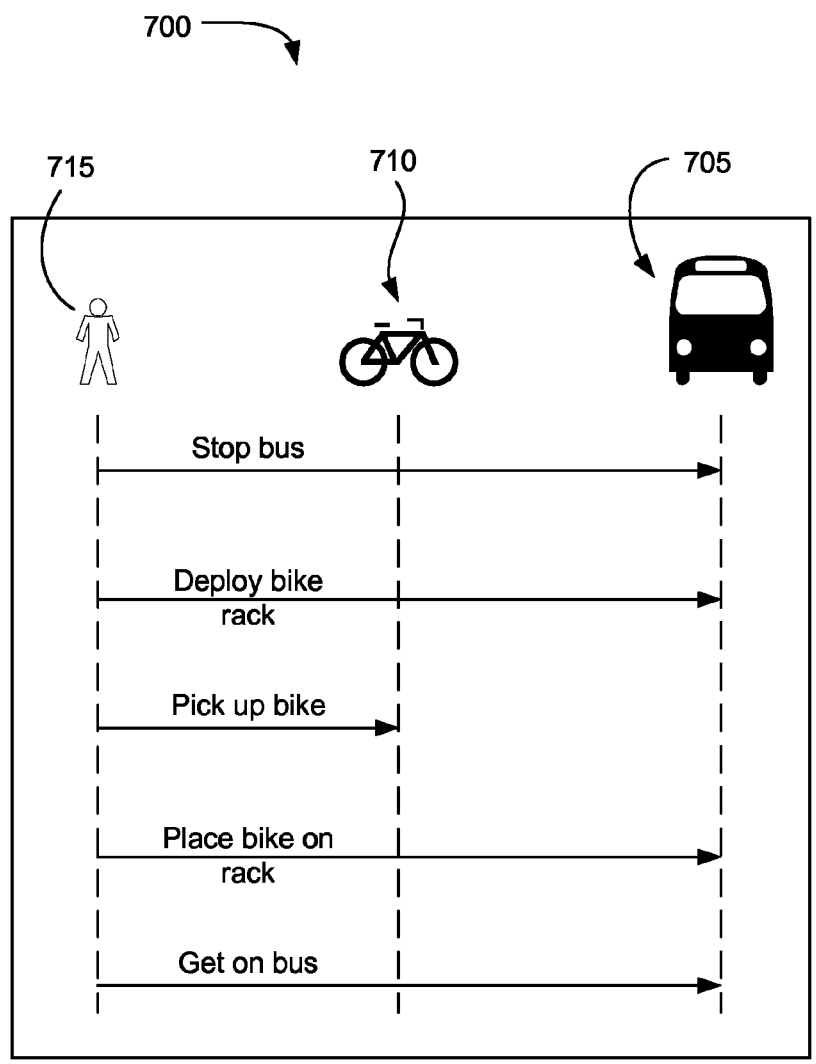
FIG. 7 is a diagram illustrating a graphical representation of an object interaction relationship, according to one exemplary embodiment of principles described herein.

In another embodiment, the user submits images of a bus (705) and a bicycle (710), according to the embodiment of FIG. 7, which shows a sample diagram (700) that is returned from the server to the image source for presentation to the user. The diagram (700) demonstrates an interaction relationship between the bicycle (710) and the bus (705), and additionally involves the interaction of a person (715). The person may cause the bus to stop. Upon stopping, the bus deploys a bicycle rack where the bicycle may be positioned during transit. The person then picks up the bicycle and places the bicycle on the rack. The person boards the bus and the bus is then able to drive to continue on to the person's destination. As demonstrated, the interaction relationship may include objects that were not shown in any of the submitted images if the additional objects are necessary or even useful in the interaction relationships between the objects included in the submitted images.

In some embodiments, the server may also return the sets of parameters used by the server to search the database for the interaction relationships. This may allow the user to view the search terms used, which may be notify the user if the images need to be modified in some way and then sent back to the server for a new search. According to some embodiments, the user may be able to adjust the image recognition software or sets of parameters generated by the server in order to perform a more accurate search. The user may also be able to submit additional search terms along with the picture, according to another embodiment.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural focus as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for automatically retrieving interaction information between objects, comprising:
   with a server, transforming a first image and a second image submitted to said server from a source into first and second sets of parameters, respectively;
   searching a database for an interaction relationship between said first and second images using said first and second sets of parameters; and
   returning a representation of said interaction relationship to said source.

2. The method of claim 1, in which said first and second sets of parameters comprise objects identified in said first and second images.

3. The method of claim 2, further comprising executing image recognition software with said server to identify said objects.

4. The method of claim 2, in which said interaction relationship between said first and second images comprises a mechanical configuration of at least one said object identified in said first image with relation to at least one said object identified in said second image.

5. The method of claim 2, in which at least one parameter in said first and second sets of parameters comprises a trait shared by multiple said objects identified in one of said first and second images.

6. The method of claim 1, in which said representation of said interaction relationship comprises a graphical depiction of said interaction relationship.

7. The method of claim 6, in which said graphical depiction of said interaction relationship comprises at least one of: an image dynamically generated by said server and an image stored by said database.

8. The method of claim 1, in which said representation of said interaction relationship comprises returning a textual description of said interaction relationship.

9. The method of claim 8, in which said textual description of said interaction relationship comprises a step-by-step description of how a first object in said first image interacts with a second object in said second image.

10. The method of claim 1, further comprising:
    transforming a third image submitted to said server from said source into a third set of parameters;
    searching said database for a first interaction relationship between said third image and said first image, and
    searching said database for a second interaction relationship between said third image and said second image.

11. The method of claim 10, further comprising returning a representation of said first interaction relationship and a representation of said second interaction relationship to said source.

12. The method of claim 10, further comprising:
    combining said first interaction relationship with said second interaction relationship to form a third interaction relationship between all of said first image, said second image, and said third image; and
    returning a representation of said third interaction relationship to said source.

13. The method of claim 1, further comprising returning said first and second sets of parameters to said source.

14. An object interaction relationship procurement system, comprising:
    a server configured to receive images from an image source, said server comprising an image-translation program for converting images into corresponding sets of parameters; and
    a database in communication with said server comprising a searchable store of object interaction relationships;
    in which said server is configured to search said database for an object interaction relationship corresponding to said parameters and return a representation of said object interaction relationship to said source.

15. The system of claim 14, in which said representation of said object interaction relationship for said images comprises a graphical depiction of said object interaction relationship.

16. The system of claim 15, in which said graphical depiction of said object interaction relationship comprises at least one of: a graphical depiction generated dynamically by said server and a graphical depiction stored in said database.

17. The system of claim 14, in which said returned representation of said object interaction relationship comprises a textual description of said object interaction relationship.

18. The system of claim 17, in which said textual description comprises a step-by-step description of how objects in said plurality of images interact with each other.

19. A computer program product for automatically retrieving interaction information between objects, the computer program product, comprising:

a non-transitory computer readable storage medium having computer readable program code embodied therewith, the computer readable program code comprising:

computer readable program code configured to transform a first image into a first set of parameters and a second image into a second set of parameters;

computer readable program code configured to search a database for an interaction relationship between objects in said first and second images; and computer readable program code configured to return a representation of said interaction relationship to a source of said first image and said second image in an organized format.

20. The computer program product of claim 19, further comprising computer readable program code configured to dynamically generate a graphical depiction of said interaction relationship.

* * * * *